United States Patent
Ghani et al.

(10) Patent No.: US 11,899,859 B2
(45) Date of Patent: Feb. 13, 2024

(54) SYSTEM AND METHOD FOR THE USE OF A SIGNATURE MACHINE TO CREATE A REMOTE ORIGINAL SIGNATURE

(71) Applicant: Aven Holdings, Inc., Burlingame, CA (US)

(72) Inventors: Usman Ghani, Burlingame, CA (US); Andrew Gray, Burlingame, CA (US); Sadi Khan, Burlingame, CA (US); Wendy Beth Oliver, Burlingame, CA (US); Murtada Shah, Burlingame, CA (US); Collin Wikman, Burlingame, CA (US)

(73) Assignee: Aven Holdings, Inc., Burlingame, CA (US)

( * ) Notice: Subject to any disclaimer, the term of this patent is extended or adjusted under 35 U.S.C. 154(b) by 4 days.

(21) Appl. No.: 17/138,781

(22) Filed: Dec. 30, 2020

(65) Prior Publication Data

US 2022/0043521 A1   Feb. 10, 2022

Related U.S. Application Data

(60) Provisional application No. 63/062,244, filed on Aug. 6, 2020.

(51) Int. Cl.
*G06F 3/038* (2013.01)
*G06F 3/04883* (2022.01)
(Continued)

(52) U.S. Cl.
CPC .......... *G06F 3/038* (2013.01); *G06F 3/03545* (2013.01); *G06F 3/041* (2013.01);
(Continued)

(58) Field of Classification Search
CPC ...... G06F 3/038; G06F 3/03545; G06F 3/041; G06F 3/04883; G06Q 30/018;
(Continued)

(56) References Cited

U.S. PATENT DOCUMENTS

| 2008/0209516 A1* | 8/2008 | Nassiri ............ G06F 21/64 726/3 |
| 2010/0011428 A1 | 1/2010 | Atwood et al. |

(Continued)

FOREIGN PATENT DOCUMENTS

WO   WO-2006056063 A2   6/2006

OTHER PUBLICATIONS

Christos Tsirbas, LongPen: From World-Famous Novelist to High-Tech Entreprenuer; posted Dec. 3, 2007.*

(Continued)

*Primary Examiner* — Phung-Hoang J Nguyen
(74) *Attorney, Agent, or Firm* — Goodwin Procter LLP

(57) ABSTRACT

A system and method for remotely generating an original signature provided by a signatory as a user of a first mobile device are disclosed. According to one embodiment, the system comprises a cloud server having a signature transmission API, and a video stream module configured to facilitate a live video stream. The system further includes a pen plotter having a plotter controller communicatively coupled to the cloud server by the signature transmission API. The pen plotter has a mechanical arm configured to receive an ink pen, and a video capture device communicatively coupled to the video stream module of the cloud server and configured to capture video of the pen plotter and transmit to the video stream module.

19 Claims, 4 Drawing Sheets

(51) Int. Cl.
- *H04N 7/18* (2006.01)
- *G06Q 30/018* (2023.01)
- *G06F 3/0354* (2013.01)
- *H04N 7/14* (2006.01)
- *G06F 3/041* (2006.01)
- *H04L 65/60* (2022.01)

(52) U.S. Cl.
CPC ....... *G06F 3/04883* (2013.01); *G06Q 30/018* (2013.01); *H04L 65/60* (2013.01); *H04N 7/141* (2013.01); *H04N 7/183* (2013.01)

(58) Field of Classification Search
CPC ......... H04L 65/60; H04L 65/61; H04L 67/02; H04N 7/141; H04N 7/183; H04N 7/147; G06V 30/347; G06V 40/37
See application file for complete search history.

(56) References Cited

U.S. PATENT DOCUMENTS

| | | | |
|---|---|---|---|
| 2010/0284033 A1* | 11/2010 | Popovic | G05B 15/02 709/204 |
| 2012/0206758 A1 | 8/2012 | Gibson et al. | |
| 2016/0078277 A1* | 3/2016 | Sprigg | G06V 10/17 382/119 |
| 2018/0349676 A1* | 12/2018 | Gibson | G06V 40/394 |

OTHER PUBLICATIONS

International Search Report and Written Opinion for International Patent Application No. PCT/US21/44203, dated Oct. 26, 2021.
International Preliminary Report on Patentability for PCT Application No. PCT/US2021/044203, dated Oct. 26, 2021.

* cited by examiner

Review Document – GUI 300

SYSTEM AND METHOD FOR THE USE OF A SIGNATURE MACHINE TO CREATE A REMOTE ORIGINAL SIGNATURE

RELATED APPLICATIONS

The present application claims priority to U.S. Provisional Patent Application Ser. No. 63/062,244 titled "System and Method for the Use of a Signature Machine to Create a Remote Original Signature", filed on Aug. 6, 2020, which is fully incorporated herein by reference.

FIELD

The present disclosure relates in general to the field of applying a physical signature to a remote document, such as a security interest.

BACKGROUND

It is common for documents to be executed through the use of signatures. With the ever-increasing communication over long distances, various kinds of signatures have been developed, such as a wet signature and an electronic or digital signature. While electronic signatures (e-signatures) and digital signatures (security keys) have grown in popularity, some documents may still require a wet signature, often referred to as an original signature, for execution, especially legal and financial documents. However, executing by an original signature becomes difficult when the signor is not physically present. Furthermore, if the document requires a notary be present, remote execution using an original signature becomes even more difficult.

Some jurisdictions across the United States permit an electronic or digital signature on documents. However, many jurisdictions still require original signatures, especially on legal and financial documents such as mortgages or deeds of trust (security instrument). Thus, executing documents using a notarized original signature remains an important tool—however, doing so remotely has often required mailing physical documents as faxing or emailing copies do not meet requirements in many jurisdictions.

SUMMARY

A system and method for remotely generating an original signature provided by a signatory as a user of a first mobile device are disclosed. According to one embodiment, the system comprises a cloud server having a signature transmission API, and a video stream module configured to facilitate a live video stream. The system further includes a pen plotter having a plotter controller communicatively coupled to the cloud server by the signature transmission API. The pen plotter has a mechanical arm configured to receive an ink pen, and a video capture device communicatively coupled to the video stream module of the cloud server and configured to capture video of the pen plotter and transmit to the video stream module.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and together with the detailed description of the preferred embodiments given below serve to explain and teach the principles of the present disclosure.

Figure 1:
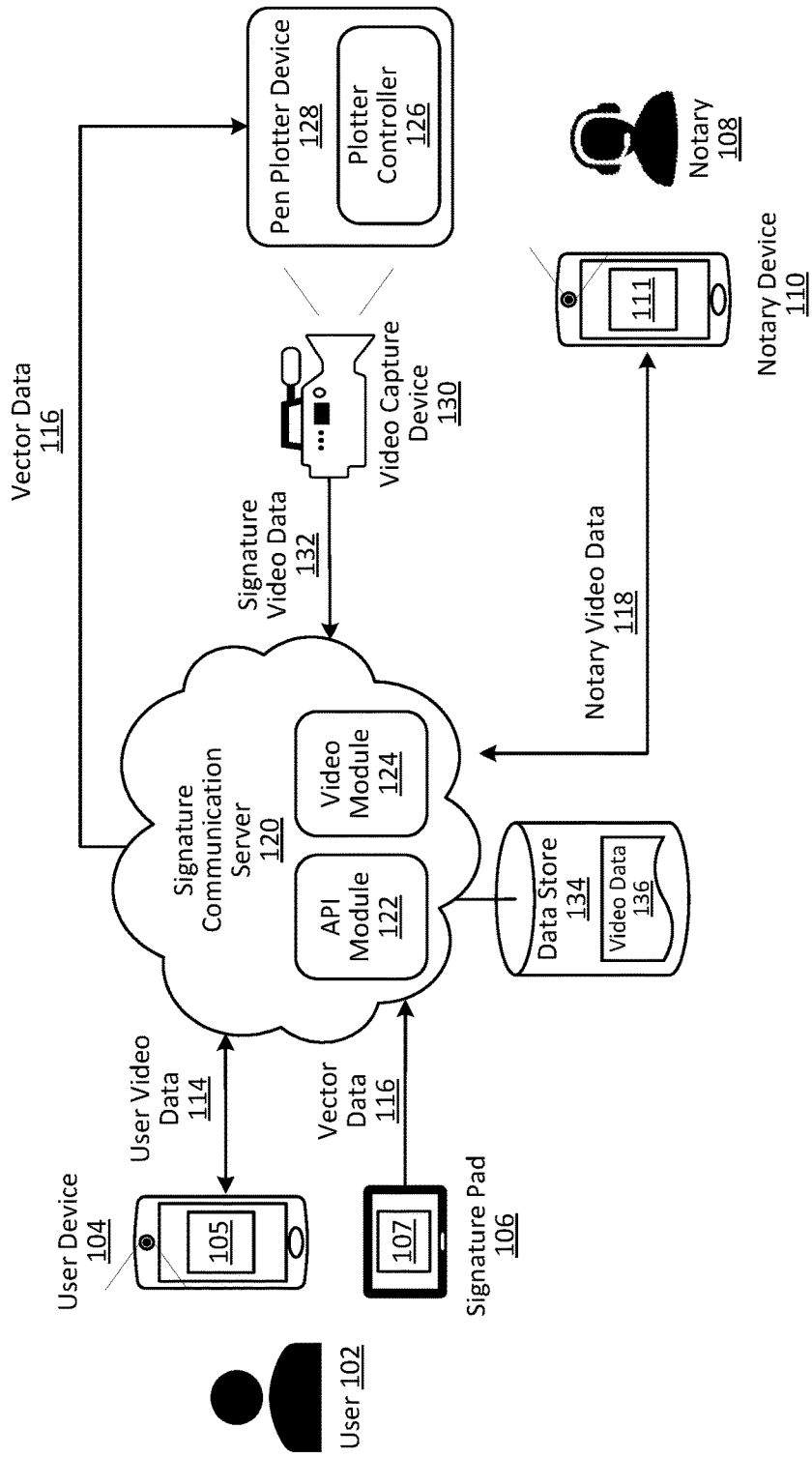
FIG. 1 depicts a remote signature platform architecture, according to some embodiments.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the disclosure.

DETAILED DESCRIPTION

A system for remotely creating an original signature is disclosed. According to one embodiment, the system includes an electronic signature pad, an API relay, a CNC pen plotter device, and a controller, among other components. The system translates a user's gestures on the electronic signature pad to vector data, transmitting the vector data over a network to the plotter device that applies the user's gestures to a document using an attached ink pen. In some embodiments, a notary may witness the creation of the signature in-person. Each of the user, the notary, and the plotter device may be recorded by an associated video capture device. In some embodiments, the notary may remotely witness the creation of the signature over a live video stream of the plotter device. The notary may further access a live video stream of the signing user to assure their participation. In some embodiments, the user is provided a live video stream of both the creation of the signature and the notary.

The disclosure provides for a signature communication platform, which uses an application programming interface (API) to transmit a scalable vector graphics path element to a pen plotter device for translating to strokes of an ink pen across a document. The vector graphics path element may be translated from a user's gestures provided to an application (e.g., web application, mobile application) on the user's mobile device (e.g., smartphone, computer). In some embodiments, a second device (e.g., tablet, second smartphone) may be used as a signature pad to receive the user's gestures and translate to the vector graphics path element. The vector transmission and video stream are both provided in real-time to allow a signing user to visualize the motion of the pen instantaneously.

FIG. 1 depicts a remote signature platform architecture, according to some embodiments. Remote signature architecture 100 includes a user 102 seeking to notarize a document using at least one associated user device. For example, architecture 100 illustrates two user devices associated with user 102: user device 104 and signature pad 106. User device 104 and signature pad 106 may include instances of a signing application executing thereon, such as applications 105 and 107 respectively. In some embodiments, the user device 104 and signature pad 106 may be the same user device (e.g., user device 104), whereon applications 105 and 107 are executed simultaneously as the same application (application 105). It should be well understood that the user may use a single application on a single device to execute the functions provided by each application 105 and 107, respectively. The functions of applications 105 and 107 are presented as executing separately on user device 104 and signature pad 106 for purposes of explanation.

According to some embodiments, architecture 100 includes another user illustrated as notary 108 accompanied by notary device 110 with application 111 executing thereon. Architecture 100 further includes signature communication server 120 including various modules for accomplishing both front end and back-end functions. For example, signature communication server 120 includes at least API module 122 and a video module 124. Signature communication server 120 may communicate with plotter controller 126 for controlling pen plotter device 128. According to some embodiments, architecture 100 further includes video capture device 130 for capturing live stream audio and video of the pen plotter device 128 and distributing by way of video module 124 of signature communication server 120.

According to some embodiments, user 102 may interact with user device 104 to initiate a signature procedure through application 105. User device 104 may further use a camera installed therein to record user 102 during the signature procedure. User 102 may then interact with signature pad 106 to provide gestures indicative of a signature through the graphical user interface of application 107. Signature pad 106 translates gestures from its touch screen to touch events provided to application 107. According to some embodiments, these touch events are captured every 500 milliseconds. Application 107 captures the touch events from the touch screen of signature pad 106 in real time and processes the touch events. In some embodiments, the touch events are smoothed by using Bezier splines to mitigate the effects of sampling that when using touch displays or mouse pads.

Application 107 converts the touch events into vector data 116 for transmission over a network (e.g., the internet). According to some embodiments, vector data 116 may include scalable vector graphics (SVG), as well other standardized vector formats. According to some embodiments, converting to SVG provides for the three types of graphic objects: vector graphic shapes such as paths and outlines consisting of straight lines and curves, bitmap images, and text. According to some embodiments, user gestures may be modelled by converting them to an SVG path element for transmitting as vector data 116.

According to some embodiments, vector data 116 may be transmitted by an application programming interface (API) relay provided by API module 122 of signature communication server 120. API module 122 provides an efficient API relay that streams vector data 116 to an API endpoint pointing to plotter controller 126. Plotter controller 126 listens to the API endpoint on API module 122 for immediately receiving vector data 116. According to some embodiments, other services such as data origination and servicing logic may be provided by API module 122 or other modules of signature communication server 120.

Upon receiving vector data 116, plotter controller 126 may interpret vector data 116 as gestures performable by pen plotter device 128. According to some embodiments, pen plotter device 128 may be a multi-axis CNC machine affixed with a commodity wet ink pen. Pen plotter device 128 is capable of writing or drawing on almost any flat surface. The wet ink pen may include, but is not limited to, fountain pens, permanent markers, and other writing implements. Pen plotter device 128 includes a writing arm that extends beyond the machine, making it possible to draw on objects bigger than the machine itself, according to some embodiments.

According to some embodiments, video capture device 130 may capture the pen plotter device 128 during the signature procedure and transmits signature video data 132 to video module 124 of signature communication server 120. Video module 124 provides for a one-way video stream that transmits signature video data 132 from video capture device 130 to user device 104, signature pad 106, and/or another device for displaying to user 102. According to some embodiments, notary 108 and pen plotter device 128 may be co-located allowing notary 108 to witness pen plotter device 128 executing a signature procedure in-person. According to other embodiments, video module 124 may further provide a one-way video stream that transmits signature video data 132 from video capture device 130 to notary device 110 for displaying to notary 108. By providing one-way video stream of pen plotter device 128 to notary 108, the present system allows notary 108 to provide notary services from a different location than pen plotter device 128. Otherwise, if notary 108 and pen plotter device 128 are co-located, notary 108 may physically observe the signature produced by pen plotter device 128.

Video module 124 further provides two-way audio and video streams between user 102 and notary 108. According to some embodiments, video module 124 allows for video transmission and recording using application 105 executing on user device 104, application 111 executing on notary device 110, as well as video capture device 130 at the location of pen plotter device 128. For example, user 102 may use a camera installed in user device 104 (e.g., a webcam of a laptop, or a camera of a mobile phone or tablet) to capture and transmit user video data 114. Notary 108 may use a camera installed in notary device 110 (e.g., a webcam of a laptop, or a camera of a mobile phone or tablet) to capture and transmit notary video data 118. Video module 124 may also transmit video data received from notary device 110 for displaying on user device 104. Similarly, video module 124 may transmit video data received from user device 104 for displaying on notary device 110.

According to some embodiments, video data 136 (e.g., user video data 114, notary video data 118, signature video data 132) may be recorded and stored in data store 134 of signature communication server 120 configured to provide redundant, highly available storage for record keeping and later verification. According to some embodiments, video data 136 stored in data store 134 may be retrieved to meet any audit or legal requirements of individual states and jurisdictions. Video data 136 may be used to establish that the signature provided by user 102 and applied by pen plotter device 128 is considered an original signature. Therefore, the original signature produced by the present disclosure is legally verifiable and provides the non-repudiation element of a notarized original signature.

Figure 2:
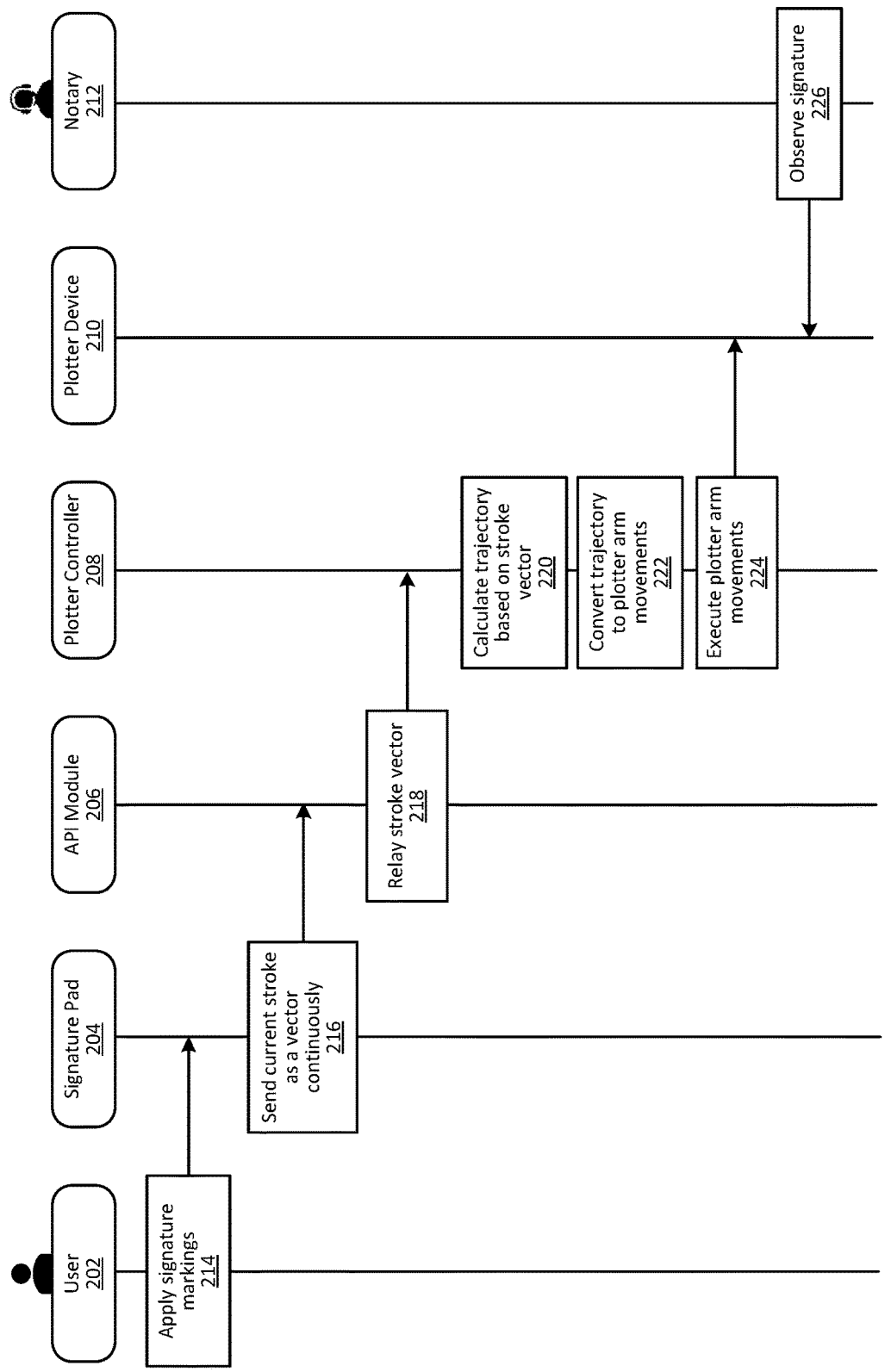
FIG. 2 depicts a flow chart of an exemplary procedure for creating a remote original signature, according to some embodiments.

FIG. 2 depicts a flow chart of an exemplary procedure for creating a remote original signature, according to some embodiments. According to some embodiments, signature procedure 200 includes 202 applying signature markings to signature pad 204 in order to allow signature pad 204 to continuously transmit stroke vectors (e.g., vector data 116) based on the received signature markings to API module 206. Upon receiving a stroke vector from signature pad 204, API module 206 may immediately relay the stroke vector to plotter controller 208 (e.g., plotter controller 126).

According to some embodiments, plotter controller 208 is configured to process the received stroke vector and convert into movements performable by arm motors 210 of a plotter device (e.g., pen plotter device 128). According to some embodiments, plotter controller 208 includes one or more processing layers. For example, plotter controller 208 may include a first layer referred to as the planning layer 220. Planning layer 220 calculates a trajectory based on the received stroke vector (e.g., an SVG path element). In some embodiments, a trajectory may be a vector of pairs, each pair including a position and a velocity. For example, the position-velocity pairs may be specified as (x, y, vx, vy) or (X, V) pairs where X and V are position and velocity vectors. In some embodiments, a trajectory may be stored or otherwise transmitted as a list (e.g., vector) of such pairs.

According to some embodiments, planning layer 220 may calculate a velocity for the starting and ending positions of each stroke, and then linearly interpolates for the rest of the path. Depending on the length of the stroke, the velocity profile may indicate a velocity spike. A velocity spike may be characterized as an inverted V, where velocity may increase and then decrease rapidly. The velocity profile may also indicate a velocity plateau characterized as a trapezoidal shape, where velocity rapidly increases, remains constant, and then rapidly decreases.

According to some embodiments, plotter controller 208 includes a second converting layer 222, which converts the trajectory positions and velocities to pulses that result in moving motors of plotter device 210 a particular number of steps. For example, plotter controller 208 may process each vector into a trajectory at 220 and then convert the trajectory into low level arm movements for the motors of plotter device 210 at 222. According to some embodiments, plotter controller 208 expresses the received stroke vector in real-world coordinates provided in real-world measurements, such as in inches or centimeters. Other coordinates or measurements may be used. According to some embodiments, plotter controller 208 may include a predetermined measurement-to-step ratio for mapping the real-world measurements (e.g., inches, centimeters, millimeters, etc.) to steps of the motors of plotter device 210 sufficient to travel the determined real-world measurements. In some embodiments, plotter controller 208 may also include a conversion from the motor's rotational frame of the plotter device 210 to the linear frame of the arm(s) using a timing belt.

Plotter controller 208 may comprise a maximum speed that translates a received stroke vector that indicates a velocity above the maximum speed to a velocity that falls below the maximum speed and is sufficient to apply ink to a document. In some embodiments, plotter device 210 may translate the received stroke vector to a constant velocity.

Motion determined from the stroke vector may then be provided and executed in terms of the real world coordinates that translate directly to the number of steps on motors of the plotter device 210. According to some embodiments, plotter device 210 may include a plurality of motors, each controlling an axis of the device's arm (e.g., x axis, y axis, z axis).

In some embodiments, plotter device 210 may also include a single motor that controls all axes of the plotter device arm simultaneously. Plotter device 210 may execute a signature in one continuous motion. In some embodiments, plotter device 210 may execute a signature through various motions defined by the stroke vector provided by user 202.

According to some embodiments, signature procedure 200 further includes a notary 212. Notary 212 may observe the signature at 226 to confirm that the signature is the legitimate signature of user 202. In some embodiments, notary 212 is provided with a video stream of user 202 to communicate and witness the activity of user 202. Notary 212 may be located near or within visual proximity to plotter device 210 to physically witness the execution of the signature by plotter device 210 in-person. In some embodiments, notary 212 may receive a second video stream for displaying the execution of the signature by plotter device 210 in real-time over a network. Notary 212 may be provided with video streams through an application (e.g., application 111) executing on his/her personal device (e.g., notary device 110). Similarly, video streams of plotter device 210 and notary 212 may be provided to user 202 through an application (e.g., application 105) executing on his/her personal device (e.g., user device 104).

Figure 3:
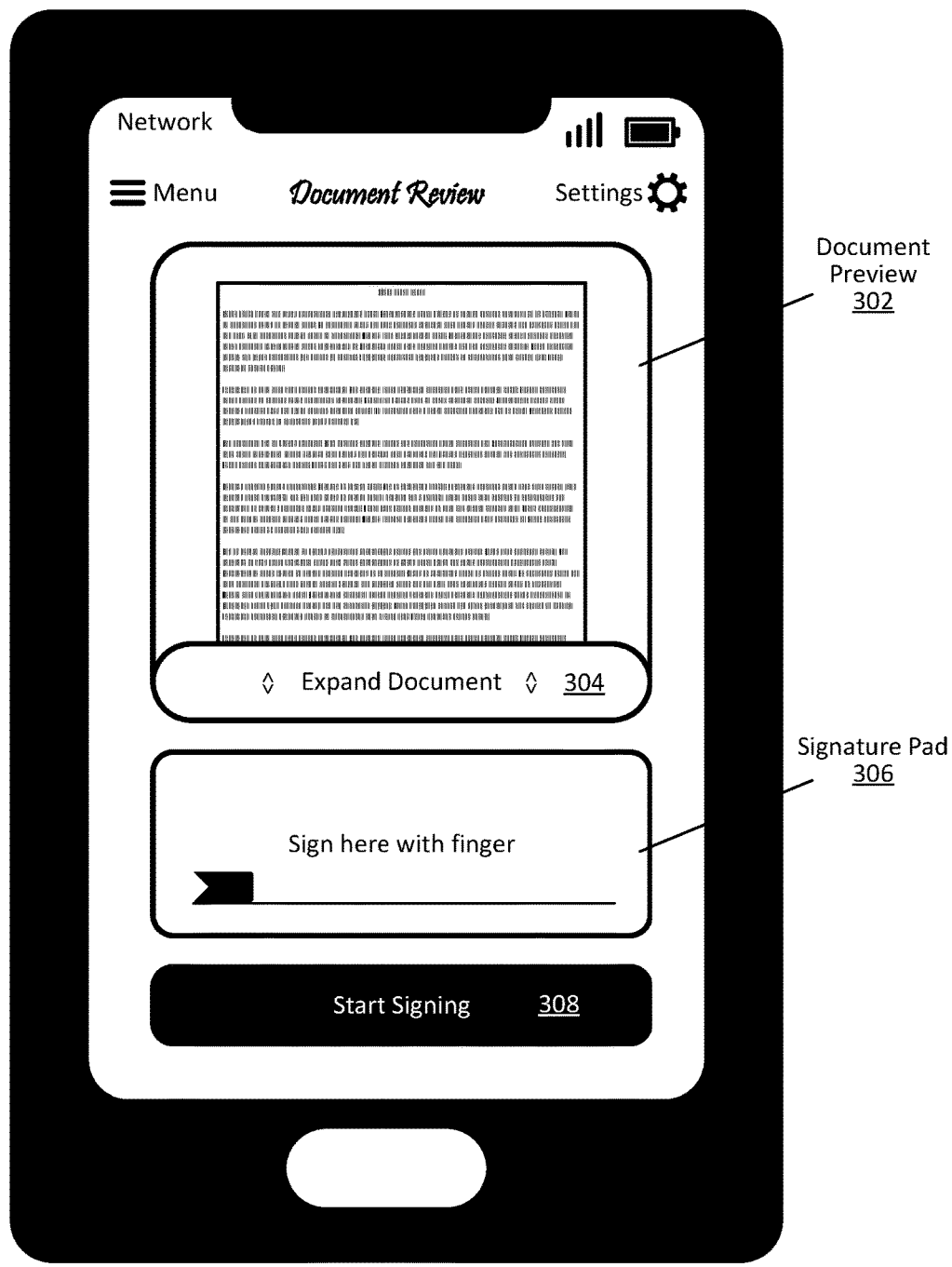
FIG. 3 depicts an exemplary graphical user interface that allows a user to review a document to be signed, according to some embodiments.

FIG. 3 depicts an exemplary graphical user interface that allows a user to review a document to be signed, according to some embodiments. Graphical user interface (GUI) 300 may be provided to a user on their personal device (e.g., user device 104, signature pad 106) to review a document before signing. GUI 300 may include a document preview component 302 for displaying a digital copy of the document to be signed. In some embodiments, the digital copy displayed by document preview component 302 may include a capture or video live stream of the physical document located on the plotter device. Some embodiments may provide a digital copy that includes only digital text of the physical document.

In some embodiments, document preview component 302 may be interactive or otherwise provide an expand button 304 to interact with the digital copy of the document (e.g., zoom, download, send, among others). In some embodiments, GUI 300 may further provide a signature pad component 306 (e.g., signature pad 106, 204). Upon interacting with signature pad 306 or start button 308, GUI 300 may display for the user a live video stream of the document and a plotter device applying ink thereto. GUI 300 may further display a live video stream of a notary to witness the user and the execution of the physical document simultaneously. According to some embodiments, video streams may be provided by a second graphical user interface (e.g., GUI 400) displayed on the same device or otherwise displayed on a second device (e.g., signature pad 106).

Figure 4:
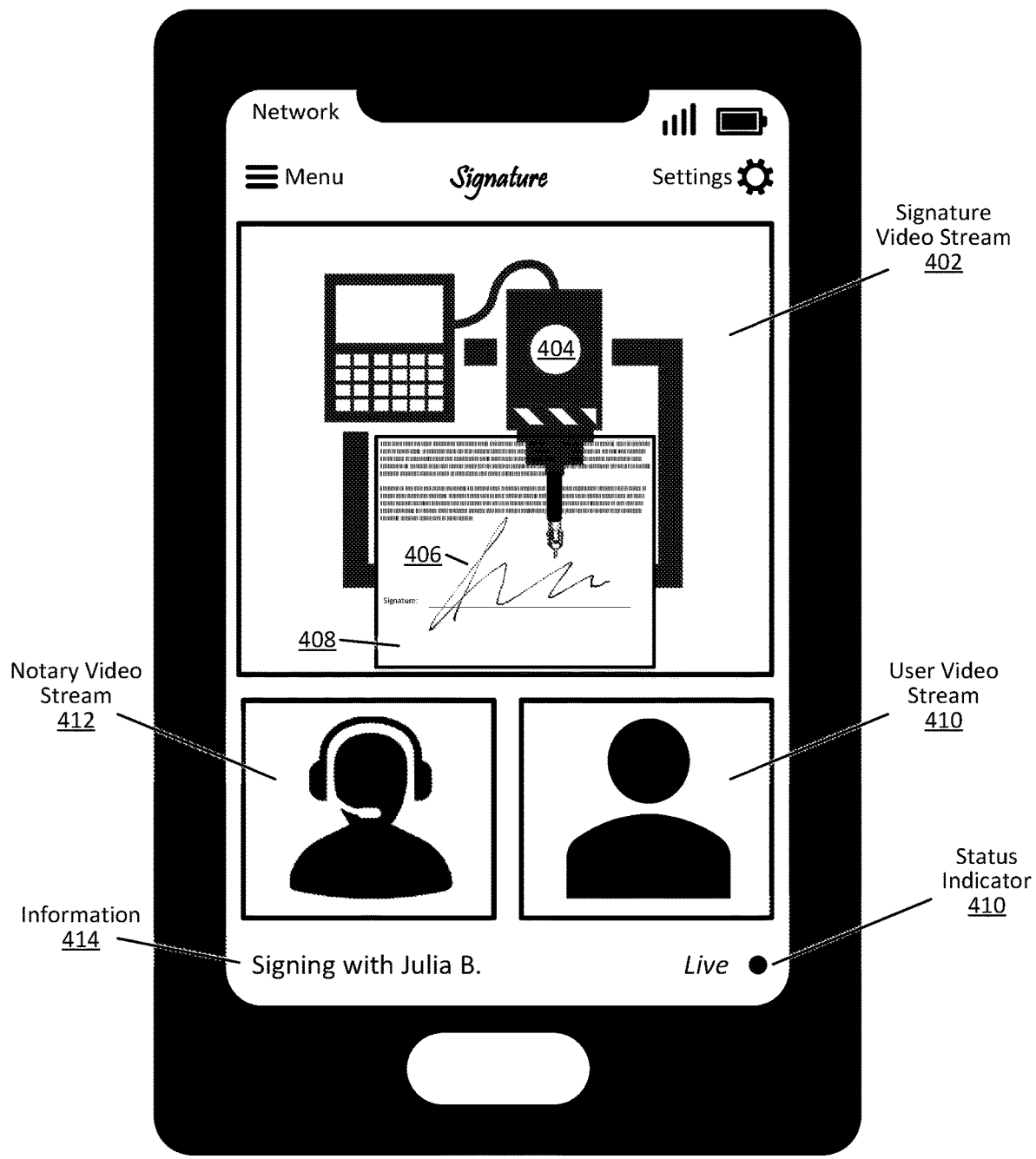
FIG. 4 depicts an exemplary graphical user interface that allows a user to create a remote original signature, according to some embodiments.

FIG. 4 depicts an exemplary graphical user interface that allows a user to create a remote original signature, according to some embodiments. GUI 400 provides a user with live video streams of each endpoint. For example, GUI 400 provides signature video stream 402 for displaying a live video stream of a plotter device 404 executing a signature 406 on a document 408. GUI 400 also provides user video stream 410 for displaying the user's own video stream used for transmission. According to some embodiments, GUI 400 may further provide a notary video stream 412 for displaying a live video stream of a notary (e.g., notary 108, 212) witnessing the user's signature. In some embodiments, GUI 400 may also provide information 414 associated with the active signature taking place. For example, GUI 400 includes information 414 that indicates the name of the notary. Information 414 may include other data, such as a title of the document, the name of the user in user video stream 410, among other data. GUI 400 may also include a status indicator 416 indicative of a live signature session and the active transmission of the video displayed in user video stream 410.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention.

What is claimed is:

1. A remote signature system, comprising:
   a cloud server having:
      a signature transmission API configured to transmit vector data of an electronic signature of a signatory to a pen plotter, wherein the vector data is obtained based on modelling user gestures of the signatory on a signature pad, and
      a video stream module configured to facilitate a live video stream; and
   the pen plotter having:
      a plotter controller communicatively coupled to the cloud server by the signature transmission API and configured to convert the vector data to movements of a mechanical arm, wherein the vector data includes scalable vector graphics, and converting the vector data includes generating velocity and position pairs and determining from the pairs a number of steps in moving a motor of the mechanical arm,
      the mechanical arm configured to receive an ink pen to generate an ink signature for the signatory based on the movements, and
      a video capture device communicatively coupled to the video stream module of the cloud server and configured to capture video of the pen plotter and transmit to the video stream module.

2. The system of claim 1, wherein the live video stream comprises:
   a captured video of the signatory; and
   the captured video of the pen plotter.

3. The system of claim 2, further comprising:
   a mobile device associated with the signatory having:
      a video camera configured to capture the video of the signatory,
      a user interface configured to display the live video stream, and
      the signature pad associated with the signatory having a touch interface configured to receive touch events from the signatory, wherein the signature pad is configured to translate the touch events to the vector data; and
   a second device associated with a witness for observing the signatory, comprising:
      a video camera configured to capture a video of the witness, and
      a witness interface configured to display the captured video of the witness;
   wherein the live video stream further comprises the captured video of the witness.

4. The system of claim 3, wherein the witness is located remotely from the pen plotter, wherein the witness interface is further configured to display the captured video of the pen plotter.

5. The system of claim 3, wherein the witness is a notary located in a jurisdiction that permits Remote Tangible Notarization.

6. The system of claim 1, wherein the plotter controller is further configured to convert the vector data to the movements of the mechanical arm by:
   receiving, from the signature transmission API, the vector data provided by the signature pad;
   calculating a trajectory for the mechanical arm based on the received vector data, wherein the trajectory comprises the pairs of position and velocity;
   translating the trajectory into the movements performable by the mechanical arm of the pen plotter; and
   executing, by the mechanical arm, the movements, wherein the ink pen administers ink markings on a document as an original signature.

7. The system of claim 1, wherein the signature pad comprises an application executing on another device associated with the signatory.

8. The system of claim 1, wherein the live video stream is stored in a data store of the cloud server.

9. A method, comprising:
   providing, by a cloud server and to a first application executing on a first mobile device, a captured video of a plotter device comprising a document;
   receiving, at the cloud server and from the first application, signatory data comprising:
      vector data indicative of a signature drawn by a signatory on a signature pad, and
      a captured video of the signatory,
      wherein the vector data is obtained based on modelling user gestures of the signatory on the signature pad; and
   transmitting, by the cloud server and to a plotter controller of the plotter device, the vector data for translating onto the document, wherein the vector data includes scalable vector graphics, and translating the vector data includes generating velocity and position pairs and determining from the pairs a number of steps in moving the plotter device.

10. The method of claim 9, wherein the plotter controller is communicatively coupled to the cloud server by a signature transmission API and configured to:
   receive, from the cloud server, the vector data;
   calculate a trajectory for a mechanical arm of the plotter device based on the received vector data, wherein the trajectory comprises the pairs of position and velocity;
   translate the trajectory into movements performable by the mechanical arm of the plotter device; and
   execute the movements by the mechanical arm comprising an ink pen, wherein the ink pen administers ink markings on the document.

11. The method of claim 9, wherein the vector data is transmitted by a signature transmission API provided by the cloud server.

12. The method of claim 9, wherein the providing and the receiving of captured videos are handled by a video stream module of the cloud server.

13. The method of claim 12, wherein the video stream module stores the received captured videos in a data store of the cloud server.

14. The method of claim 9, further comprising:
providing, by the cloud server and to a second application executing on a second mobile device associated with a witness, the captured video of the signatory;
receiving, by the cloud server and from the second application, a captured video of the witness; and
providing, by the cloud server and to the first application, the captured video of the witness.

15. The method of claim 14, further comprising:
providing, by the cloud server and to the second application, the captured video of the plotter device, wherein the witness associated with the second mobile device is located remotely from the plotter device.

16. The method of claim 14, wherein the witness is a notary located in a jurisdiction that permits Remote Tangible Notarization.

17. The method of claim 9, wherein the signature pad comprises an application executing on the first mobile device or another device associated with the signatory.

18. The method of claim 11, wherein the plotter device is further configured to:
calculate a velocity of starting and ending positions of each stroke of the signatory on the signature pad; and
convert the trajectory positions and velocities to pulses in moving the plotter device.

19. The method of claim 11, wherein the plotter device is further configured to convert a rotational frame of a plotter device motor to a linear frame of the mechanical arm using a timing belt.

* * * * *